J. W. BUTTS.
METER BOX.
APPLICATION FILED JULY 1, 1910.

976,038.

Patented Nov. 15, 1910.

WITNESSES:

INVENTOR.
J. W. Butts
BY
ATTORNEY.

UNITED STATES PATENT OFFICE.

JOEL WINKFIELD BUTTS, OF MONROE, GEORGIA.

METER-BOX.

976,038.  Specification of Letters Patent.  Patented Nov. 15, 1910.

Application filed July 1, 1910.  Serial No. 569,994.

*To all whom it may concern:*

Be it known that I, JOEL WINKFIELD BUTTS, a citizen of the United States, residing at Monroe, in the county of Walton and State of Georgia, have invented certain new and useful Improvements in Meter-Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in meter boxes.

The object of the invention is to provide in a meter box construction means which will permit the convenient attaching and detaching of the meter, in a simple and economical manner.

Figure 1:
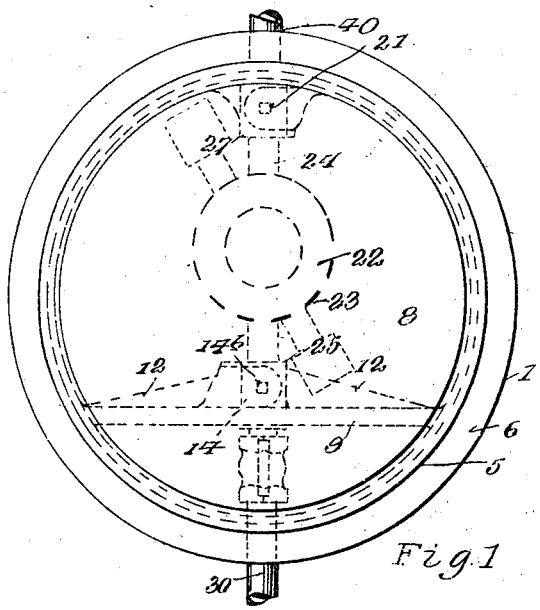
Figure 2:
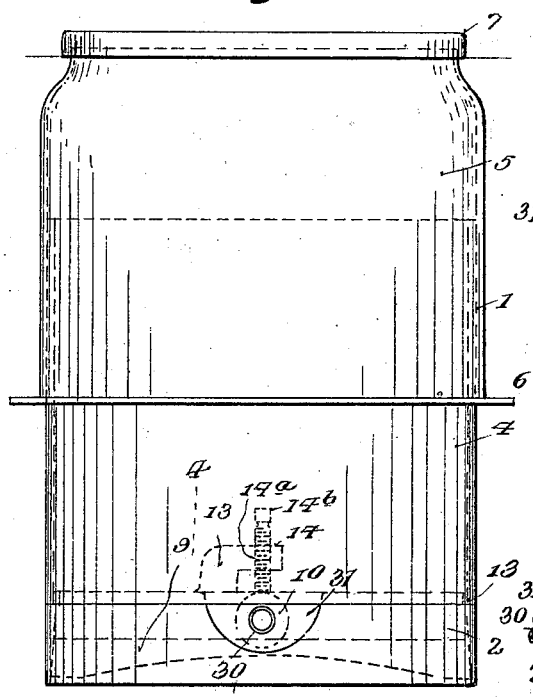
Figure 3:
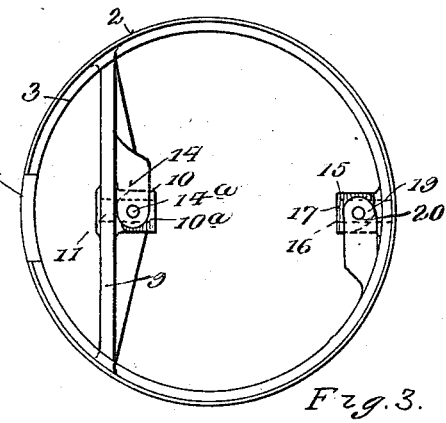
Figure 4:
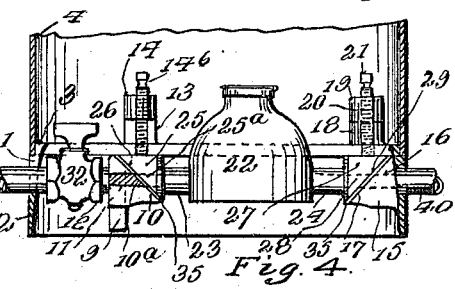

In the drawings:—Figure 1 is a plan view of my improved meter box. Fig. 2 is an elevation of the same. Fig. 3 is a detail top plan view of the lower or base portion of my improved meter box, the meter being omitted. Fig. 4 is a transverse section on the line 4—4, Fig. 2 the meter and pipe connection being shown in elevation.

The same numerals refer to like parts in all the figures.

1 represents a meter box, which comprises a base 2, provided with an annular flange 3, an intermediate section 4 which is supported on the flange 3, and an upper adjustable section 5. The upper section 5, is provided at its lower edge with a flange 6, and at its top with an annular seat 7, to receive a cover 8. The said upper section 5, slips over the upper part of the intermediate section 4, one section telescoping in the other, whereby to adjust the relative height of the boxes.

The base section 2, is provided with an integral bar 9 having at approximately its center an inwardly projecting boss 10, formed with a threaded opening 11. The inner face $10^a$ of the boss is beveled at an angle of approximately 45° and is planed to provide a perfectly smooth surface. Extending from the sides of the boss are webs 12—12, to form substantial lateral braces. To one side of the boss 10, extends upwardly a standard 13, having at its upper end an overhanging arm 14, formed with a threaded opening $14^a$ located over the beveled surface $10^a$, and in which is fitted a screw $14^b$.

On the opposite side of the base section 2, and integral therewith and in alinement with the boss 10, is a second boss 15, having a central threaded perforation 16. The inner face of the boss 15 is beveled to approximately 45° and is planed as indicated at 17, the beveled surface however being opposite to the beveled surface $10^a$, the two said beveled surfaces forming a seat for the meter connections.

Extending up from the section 2, adjacent the boss 15, is a standard 18, having an overhanging arm 19, provided with a threaded opening 20, in which is fitted a screw 21, located directly over the beveled surface 17.

The numeral 22, indicates conventionally, a meter from the opposite sides of which extend nipples 23 and 24. Screwed to the outer end of the nipple 23, is a boss 25, formed with an opening $25^a$ and provided with a planed beveled surface 26, corresponding to the angle of the beveled surface at $10^a$, of the boss 10. On the outer end of the nipple 24 is screwed a boss 27, having an opening 28, and beveled on its under surface at 29, to correspond to the beveled surface 17 of the boss 15 a discharge pipe 40 is screwed into the outer end of the opening 28 for the passage of water.

A supply pipe 30, is screwed into the boss 10 and it extends through a cut away portion 31, in the base 1. The supply pipe is provided with a stop cock 32 to control the flow of water, from the inside of the box.

To install a meter, the latter is placed down in the box with the nipples 23 and 24, at an angle to the vertical plane of the supply and discharge pipes 30 and 40, as shown in dotted lines in Fig. 1 to permit the bosses 25 and 27 to be turned under the overhanging arms 14 and 19. When the meter is positioned at substantially the same level as the arms 14 and 19 it is given a slight turn to bring the beveled surfaces $10^a$ and 17 of the bosses 25 and 27 into alinement with the beveled surfaces $10^a$ and 17 of the bosses 10 and 15. Between the beveled surfaces are gaskets 35—35 to form tight joints. After the beveled surfaces have been properly positioned the screws $14^b$ and 21, are screwed down tight on the upper surfaces of the bosses 25 and 27, and as the beveled surfaces of all the bosses are of the same angle a tight and absolutely secure joint is made between the connections. The meter having been positioned the cock 32 is turned and the whole apparatus is ready for use.

To remove the meter the operation of installing is reversed.

Obviously by the construction described, I have provided a simple and effective means for quickly and conveniently installing or removing a meter. Inasmuch as I dispense with threaded connections between the pipes and meter, I am enabled to provide a meter box of much less diameter than boxes now in use. This is due to the fact that the mechanic in assembling or taking down the parts does not have to get down under the pipes to secure the same to the meter.

I desire it to be understood that I may dispense with the specific form of meter box, if found convenient, as my invention resides more particularly in the connection between the meter and the support.

By constructing the connections as described, the water is permitted to have a straight passage through the meter box, thus avoiding liability of crevices or seats for the accumulation of sediment or foreign substances.

What I claim is:—

1. In an apparatus of the class described, the combination of a supporting base provided with bosses having their faces oppositely beveled, a meter having connections provided with bosses having their faces beveled to correspond with and registering with the beveled surfaces of the bosses, and screws bearing on the bosses of the meter connections to clamp all the bosses together, all the bosses having registering openings.

2. In an apparatus of the class described the combination with a base support, a meter, a connection between the base support and the meter including castings having their adjacent faces oppositely beveled, and means for clamping the castings to form a tight joint between the beveled surfaces.

3. In an apparatus of the class described, the combination of a base support, a bar extending across the base support and provided with an opening, the inner surface of the bar adjacent the opening being beveled, the supporting base having a member provided with a beveled surface in alinement with the beveled surface on the base support, the base support having an opening adjacent the beveled element thereon, a meter having members provided with beveled surfaces which correspond with the beveled surfaces on the base support, standards formed with threaded openings, and screws engaging the threaded openings and adapted to clamp the meter to the support to effect a tight joint between the beveled surfaces.

4. In an apparatus of the class described, the combination of a base support, provided with openings, the surfaces of the metal adjacent the openings being beveled, an arm adjacent each beveled surface, each arm being formed with a threaded opening in alinement with the beveled surfaces, a meter provided with members having beveled surfaces which correspond with the beveled surfaces on the base support, screws engaging the threaded openings in the arms and adapted to clamp the beveled surfaces together to form a tight joint.

5. In an apparatus of the class described the combination with a curb box made in sections, the lowermost section forming a base, and formed with a casting having an opening and a beveled surface adjacent the inner end of the opening, a standard having its upper end extending over the plane of the beveled surface and provided with a threaded opening, a pipe fitted in the outer end of the opening in the casting, a stop cock in the pipe, a boss extending from the base section and having an opening, a pipe communicating with the latter opening, the inner face of the boss adjacent the opening being beveled opposite to the bevel of the surface on the casting, an overhanging arm adjacent the boss, said arm having a threaded opening, a meter provided with bosses having beveled surfaces which correspond with the beveled surfaces on the base, and screws engaging the threaded openings and the bosses on the meter to hold said meter in the meter box.

In testimony whereof I have signed my name to this specification in the presence of two subscribing witnesses.

JOEL WINKFIELD BUTTS.

Witnesses:
H. B. WILLIAMSON,
J. W. McGAUGHEY.